(12) United States Patent
Perronnet et al.

(10) Patent No.: US 9,915,173 B2
(45) Date of Patent: Mar. 13, 2018

(54) BEARING SUPPORT FOR A HOT SECTION OF A TURBOSHAFT ENGINE, AND AN ASSOCIATED TURBOSHAFT ENGINE

(71) Applicant: TURBOMECA, Bordes (FR)

(72) Inventors: Jean-Francois Perronnet, Pau (FR); Jean-Luc Breining, Pau (FR); Manuel Silva, Gelos (FR)

(73) Assignee: TURBOMECA, Bordes (FR)

(*) Notice: Subject to any disclaimer, the term of this patent is extended or adjusted under 35 U.S.C. 154(b) by 597 days.

(21) Appl. No.: 14/370,556

(22) PCT Filed: Jan. 11, 2013

(86) PCT No.: PCT/FR2013/050068
§ 371 (c)(1),
(2) Date: Jul. 3, 2014

(87) PCT Pub. No.: WO2013/107966
PCT Pub. Date: Jul. 25, 2013

(65) Prior Publication Data
US 2015/0000306 A1    Jan. 1, 2015

(30) Foreign Application Priority Data
Jan. 20, 2012    (FR) ..................... 12 50574

(51) Int. Cl.
*F01D 25/16*    (2006.01)
*F16C 35/02*    (2006.01)
*F02C 3/10*    (2006.01)

(52) U.S. Cl.
CPC ............ *F01D 25/162* (2013.01); *F02C 3/103* (2013.01); *F16C 35/02* (2013.01); *Y02T 50/671* (2013.01)

(58) Field of Classification Search
CPC ................................ F01D 25/162; F16C 35/02
See application file for complete search history.

(56) References Cited

U.S. PATENT DOCUMENTS 2,744,722 A * 5/1956 Orr ..................... F01D 9/065
                                                             384/321
3,536,414 A    10/1970 Smith, Jr.
(Continued)

FOREIGN PATENT DOCUMENTS

EP    1 921 007    5/2008
EP    2 169 182    3/2010
(Continued)

OTHER PUBLICATIONS

Makila, Technical Characteristics ofr Makila 2A, copyright Jan. 2004.*
(Continued)

*Primary Examiner* — Woody Lee, Jr.
*Assistant Examiner* — Brian O Peters
(74) *Attorney, Agent, or Firm* — Oblon, McClelland, Maier & Neustadt, L.L.P.

(57) ABSTRACT

A support, for example for a turboshaft engine, or for at least one bearing for a hot section of a turboshaft engine. The support includes at least a central hub incorporating an outer bearing seat for directly receiving the bearing, an annular casing segment around the central hub, and a plurality of radial arms connecting the central hub to the casing segment. The radial arms are inclined in an axial direction and in a tangential direction and are integrated as a single piece with the central hub and with the annular casing segment.

16 Claims, 2 Drawing Sheets

(56) References Cited

U.S. PATENT DOCUMENTS

| | | | |
|---|---|---|---|
| 3,830,056 A * | 8/1974 | Willis, Jr. | F02C 3/10 |
| | | | 60/39.163 |
| 3,830,058 A | 8/1974 | Ainsworth | |
| 4,428,713 A * | 1/1984 | Coplin | F01D 25/08 |
| | | | 415/116 |
| 4,989,406 A * | 2/1991 | Vdoviak | F01D 25/162 |
| | | | 244/117 A |
| 6,353,789 B1 | 3/2002 | Hanson | |
| 8,201,414 B2 * | 6/2012 | Haehner | F01D 15/08 |
| | | | 60/788 |
| 2008/0135679 A1 | 6/2008 | Udall | |
| 2009/0116955 A1 * | 5/2009 | Dauriac | F02C 3/10 |
| | | | 415/144 |
| 2010/0080697 A1 | 4/2010 | Wojno et al. | |

FOREIGN PATENT DOCUMENTS

| | | |
|---|---|---|
| GB | 938286 | * 10/1963 |
| GB | 1 010 401 | 11/1965 |
| GB | 1 428 091 | 3/1976 |
| JP | 3 189304 | 8/1991 |

OTHER PUBLICATIONS

International Search Report dated Mar. 14, 2013 in PCT/FR13/050068 Filed Jan. 11, 2013.

* cited by examiner

BEARING SUPPORT FOR A HOT SECTION OF A TURBOSHAFT ENGINE, AND AN ASSOCIATED TURBOSHAFT ENGINE

BACKGROUND OF THE INVENTION

The present invention relates to the field of turboshaft engines, and in particular to a support for at least one bearing for a hot section of a turboshaft engine, the support comprising a central hub incorporating an outer bearing seat for receiving the bearing, an annular casing segment around the central hub, and a plurality of radial arms connecting said central hub to said annular casing segment.

In the present context, the term "turbine engine" is used to mean any machine for converting the thermal energy of a working fluid into mechanical energy by expansion of said working fluid in a turbine. In the description below, the terms "upstream" and "downstream" are defined relative to the normal flow direction of the working fluid in the turbine engine.

Typically, in such a turbine engine, the working fluid is contained in an annular flow passage between a casing and at least one rotary shaft around a central axis. Said rotary shaft is constrained to rotate together with at least one turbine engine wheel through which said annular fluid flow passage passes. In order to support the wheel, the rotary shaft is supported by at least one bearing, which in turn is supported by a bearing support having a plurality of arms passing radially through the fluid flow passage in order to connect the bearing to the casing of the turbine engine.

Among the various types of turbine engine, there are in particular turboshaft engines. In a turboshaft engine, at least one turbine wheel situated downstream from a compressor and a combustion chamber is coupled to an outlet shaft for taking off the mechanical energy produced by the engine. This distinguishes turboshaft engines in particular from turbojets in which mechanical energy is recovered mainly by the combustion gas expanding in a reaction nozzle. Consequently, in the hot section of a turboshaft engine, i.e. in the combustion chamber and downstream therefrom, thermal stresses are severe because of temperature gradients that are large compared with the size of such an engine. In particular, bearings and bearing supports situated in the hot section are subjected to particularly severe thermomechanical stresses.

In order to accommodate the dynamic stresses on shaft lines and in order to master any tendency of turbines to move off-center while in operation, it is desirable to obtain a high degree of radial stiffness for bearing supports, even at high temperatures. Nevertheless, such great stiffness for a bearing support can have negative repercussions on its lifetime.

In British patent GB 1 010 401, there is described a bearing support for a hot section of a turbine engine in which a central hub is suspended from an annular casing segment of the turbine engine by rods that slope in a radial direction and in a tangential direction. Nevertheless, in order to accommodate thermomechanical forces between the hub and the annular casing section, the ends of those rods are hinged. In addition, the rods are protected by tubular fairings having outer ends that may move longitudinally a little relative to the annular casing section in order to accommodate those same thermomechanical forces. Consequently, that bearing support is very complex, thereby giving rise to high production and maintenance costs.

OBJECT AND SUMMARY OF THE INVENTION

The invention seeks to propose a support for at least one hot section bearing of a turboshaft engine that makes it possible to obtain a high degree of radial stiffness and of stiffness in bending, even at high temperatures, while nevertheless obtaining a good lifetime and doing so with great simplicity.

For this purpose, in at least one embodiment of the invention, said radial arms are inclined in an axial direction and in a tangential direction and are integrated as a single piece with the central hub and with the annular casing segment. In this context, the term "inclination in an axial direction" is used to mean inclination relative to the radial direction in a longitudinal plane in alignment with the central axis of the bearing. In this context, the term "inclination in a tangential direction" is used to mean inclination relative to the radial direction in a transverse plane perpendicular to the central axis of the bearing.

Because of the tangential inclination of the arms and because they are integrated as a single piece with the central hub and with the annular casing segment, these arms transfer a fraction of their radial loads from the bearing in bending, instead of doing so solely in traction-and-compression as with the rods of the support of GB 1 010 401, thereby avoiding in particular any radial indentation of the annular segment of the casing at the roots of the radial arms on the casing. Furthermore, the axial inclination reinforces the arms in bending relative to radial loads, thereby also achieving a perceptible improvement in the radial stiffness of the support. It is thus possible to obtain a bearing support that is very stiff while nevertheless having good lifetime even in a thermomechanical environment that is as demanding as the hot section of a turboshaft engine.

In particular, the support may further include at least one fastener flange on an axial end of said annular casing segment, and each radial arm may be inclined axially from a root on said annular casing segment towards the axial end presenting the fastener flange. It is thus possible to obtain a greater axial distance for the radial arms relative to said fastener flange at the roots of the arms on the annular casing segment than at the roots of the arms on the central hub. This axial distance on the annular casing segment serves to distribute mechanical loads and thermal gradients better between the radial arms and the fastener flange, thereby increasing the lifetime of the support, without harming its overall stiffness. In order to distribute the forces in the proximity of the root of each arm on the annular casing segment, said fastener flange may be festooned in register with the root of each radial arm over said annular casing segment. This avoids excessive stiffness of the annular casing segment in the proximity of said root, where that could give rise to excessive force concentrations. In addition, said fastener flange may present at least one positive engagement element, such as a peg or an orifice for receiving a complementary peg, in order to take up forces in a plane perpendicular to the central axis of the bearing.

In particular, in order to avoid excessively increasing the frontal area, the weight, and the radial flexibility of the support, and in order to avoid loading the radial arms in bending only, said radial arms may present a tangential angle of inclination $\beta$ that is not greater than 70°.

In particular, in order to avoid excessively increasing the axial extent of the support, and thus avoid loading the radial arms excessively in bending, said radial arms may present an axial angle of inclination $\alpha$ that is not greater than 45°.

In particular, in order to decrease the resistance of the support to fluid flowing in the fluid flow passage, each of said radial arms may have a streamlined profile that is set at an angle relative to an axial direction. The angular setting directs the profile to lie in the direction of a helical flow in the fluid flow passage in order to reduce the resistance of the profile to the flow, and also in order to increase the bending stiffness of the profile in the transverse plane. More particularly, said streamlined profiles may present a pitch angle γ that is not greater than 30°.

The invention also relates to a turbine engine including at least one such bearing support. In particular, said bearing support may be situated adjacent to and downstream from a turbine wheel of the turboshaft engine, and said radial arms may be inclined axially in an upstream direction from said casing segment, thereby limiting the offset between the support arms and the turbine wheel, while obtaining a certain amount of axial spacing between the blade tips of the turbine wheel and the roots of the radial arms on the annular casing segment, thereby limiting vibratory aerodynamic loading. More particularly, in order to fasten the bearing support to a turbine casing, said bearing support may include a fastener flange situated at an upstream axial end of said annular casing segment. Under such circumstances, the axial inclination of the radial arms also makes it possible to obtain an axial spacing between the fastener flange and the roots of the radial arms on the annular casing segment, thereby better distributing the thermal and mechanical forces between the flange and the roots.

Nevertheless, the bearing support may alternatively be situated adjacent to and upstream from a turbine wheel of the turboshaft engine, for example.

In addition, the turboshaft engine may in particular comprise at least a compressor, a combustion chamber, a first combustion gas turbine coupled to rotate with at least one compressor by a first rotary shaft, and a second combustion gas turbine coupled to rotate with a power takeoff by a second rotary shaft, and bearing support may be a bearing support for the second rotary shaft, thereby making it possible to accommodate the particularly high mechanical and thermal forces to which a bearing support for a free turbine is typically subjected in such a turboshaft engine. Nevertheless, as an alternative or in addition, at least one bearing support of the first rotary shaft may also be configured in the same manner, with arms that are inclined axially and tangentially, and possibly also presenting a streamlined profile that is pitched at an angle relative to an axial direction.

BRIEF DESCRIPTION OF THE DRAWINGS

The invention can be well understood and its advantages appear better on reading the following detailed description of an embodiment given by way of non-limiting example. The description refers to the accompanying drawings, in which.

DETAILED DESCRIPTION OF THE INVENTION

Figure 1:
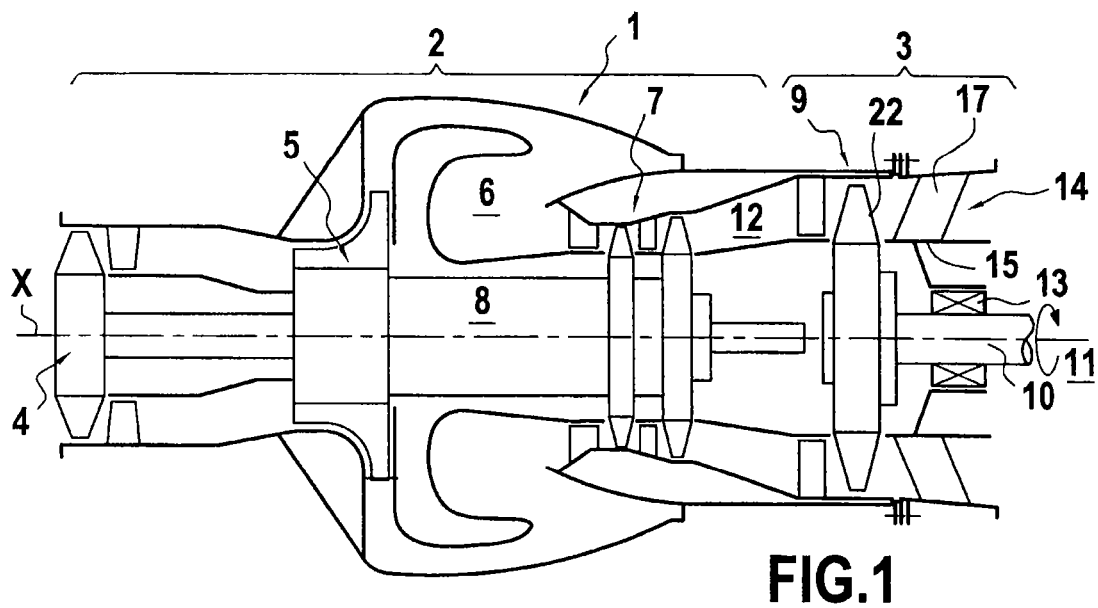
FIG. 1 is a diagrammatic longitudinal section view of a turboshaft engine.

A turboshaft engine 1 is shown in FIG. 1. The turboshaft engine 1 comprises a gas generator segment 2 and a free turbine segment 3. The gas generator segment 2 comprises an axial compressor 4, a radial compressor 5, a combustion chamber 6, a first combustion gas turbine 7, and a first rotary shaft 8 on a central axis X for coupling together in rotation the wheels of the first combustion gas turbine 7 and of the compressors 4 and 5, so that rotation of the shaft serves to actuate the compressors 4 and 5 while the engine 1 is in operation. The free turbine segment 3, situated downstream from the gas generator segment 2, comprises a second combustion gas turbine 9 referred to as a "free turbine", and a secondary rotary shaft 10 that is likewise in alignment on the central axis X and that couples the free turbine 9 to a power takeoff 11. Thus, rotation of the wheel of the free turbine 9 while the turboshaft engine 1 is in operation can serve to actuate an external device, such as for example a helicopter rotor.

The rotary shafts 8, 10 are supported by bearings, which bearings are supported by bearing supports comprising pluralities of radial arms that pass through the gas flow passage 12. In particular, in the free turbine segment 3 of the embodiment shown, the second rotary shaft 10 is supported by at least one bearing 13, which in turn is supported by a bearing support 14 situated adjacent to and downstream from the wheel 22 of the free turbine 9, and comprising, integrated in a single piece, a central hub 15, an annular casing segment 16, and a plurality of radial arms 17, e.g. five arms, passing through the gas flow passage 12 in order to connect the central hub 15 to the annular casing segment 16. The bearing 13 is received directly in an outer bearing seat formed in the central hub 15, and, at its upstream axial end, the annular casing segment 16 presents a fastening flange 18 for fastening the bearing support 14 to a turbine casing 19. This fastener flange 18 presents not only orifices 30 for receiving bolts for fastening the support 14, but also projecting pegs 31 that are to be received in complementary orifices in a surface facing the flange 18 so as to obtain positive engagement enabling the support 14 to be positioned accurately, and also so as to take up forces in a transverse plane, in particular to avoid shearing said bolts.

This bearing support 14 is shown in greater detail in FIGS. 2, 2A, and 3 to 5. Thus, in FIG. 2, there can be seen an angle of inclination α of the radial arms 17 in an axial direction relative to a transverse plane, and in FIG. 3, an angle of inclination β of the radial arms 17 in a transverse plane relative to a radial direction. In the embodiment shown, the annular inclination α is less than or equal to 45°, while the angle of inclination β is less than or equal to 70°.

Each radial arm 17 is hollow, thereby enabling a lubricating fluid duct 20 to pass therethrough, together with a sensor 21 for sensing breakage of the turbine wheel 22. Because of the axial angle of inclination of the radial arms 17, the offset between the inner roots of the radial arms 17 and of the turbine wheel 22 can be minimized, thereby making it possible in particular to place the sensor 21 particularly close to the turbine wheel 22. Furthermore, at the outer roots of the radial arms 17, the axial distance from the fastener flange 18, which is relatively stiff and remains comparatively cool while the engine 1 is in operation, enables thermal and mechanical forces to be better distributed between these outer roots and the fastener flange 18. Furthermore, this axial distance also serves to separate the outer roots of the radial arms 17 from the blade tips 23 of the turbine wheel 22. In order to avoid excessive stiffness of the annular casing segment 16 close to these outer roots, the fastener flange 18 is festooned in register therewith.

Figure 3:
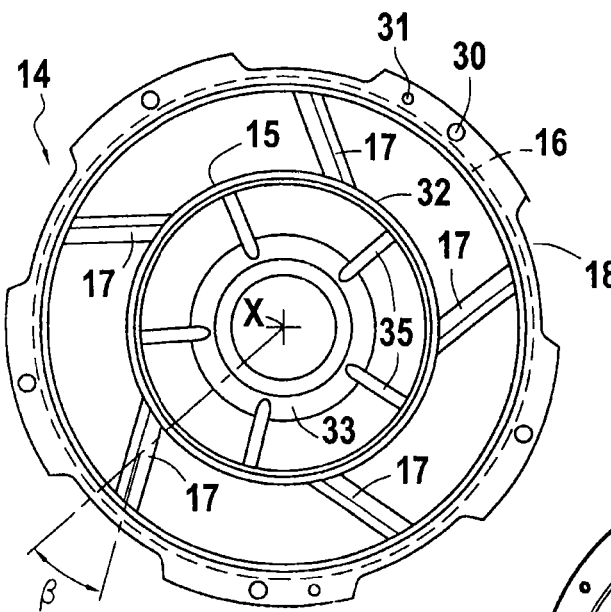
FIG. 3 is a front view of the FIG. 2 bearing support.
Figure 4:
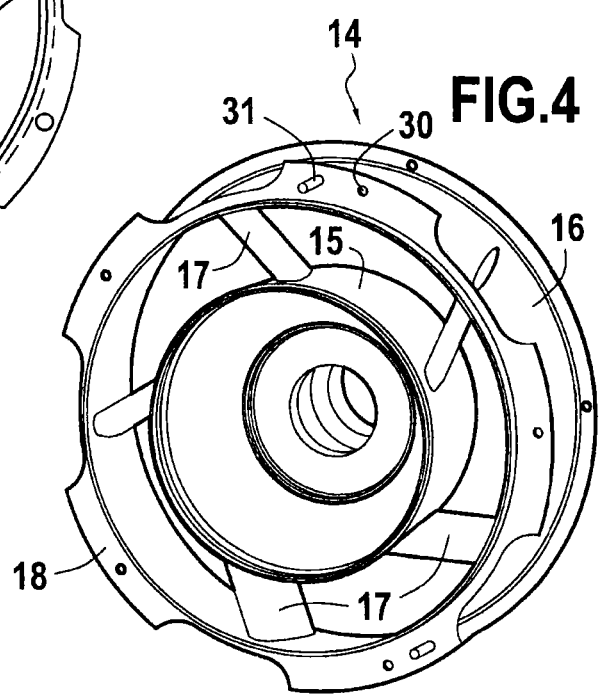
FIG. 4 is a front perspective view of the FIG. 2 bearing support.
Figure 5:
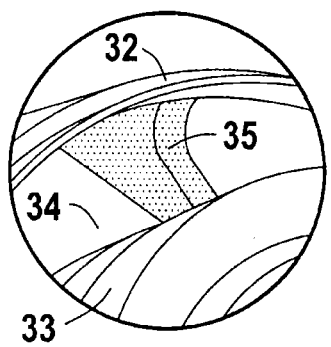
FIG. 5 is a detail view of the FIG. 2 bearing support.

Because of the tangential angle of inclination of the radial arms 17, as can be seen in FIG. 3, the radial loads of the bearing 13 are transmitted by the radial arms 17 not only in traction-and-compression, but also in part in bending, thus making it possible to avoid indenting the annular casing segment 16 at the outer roots of the radial arms 17.

Figure 2:
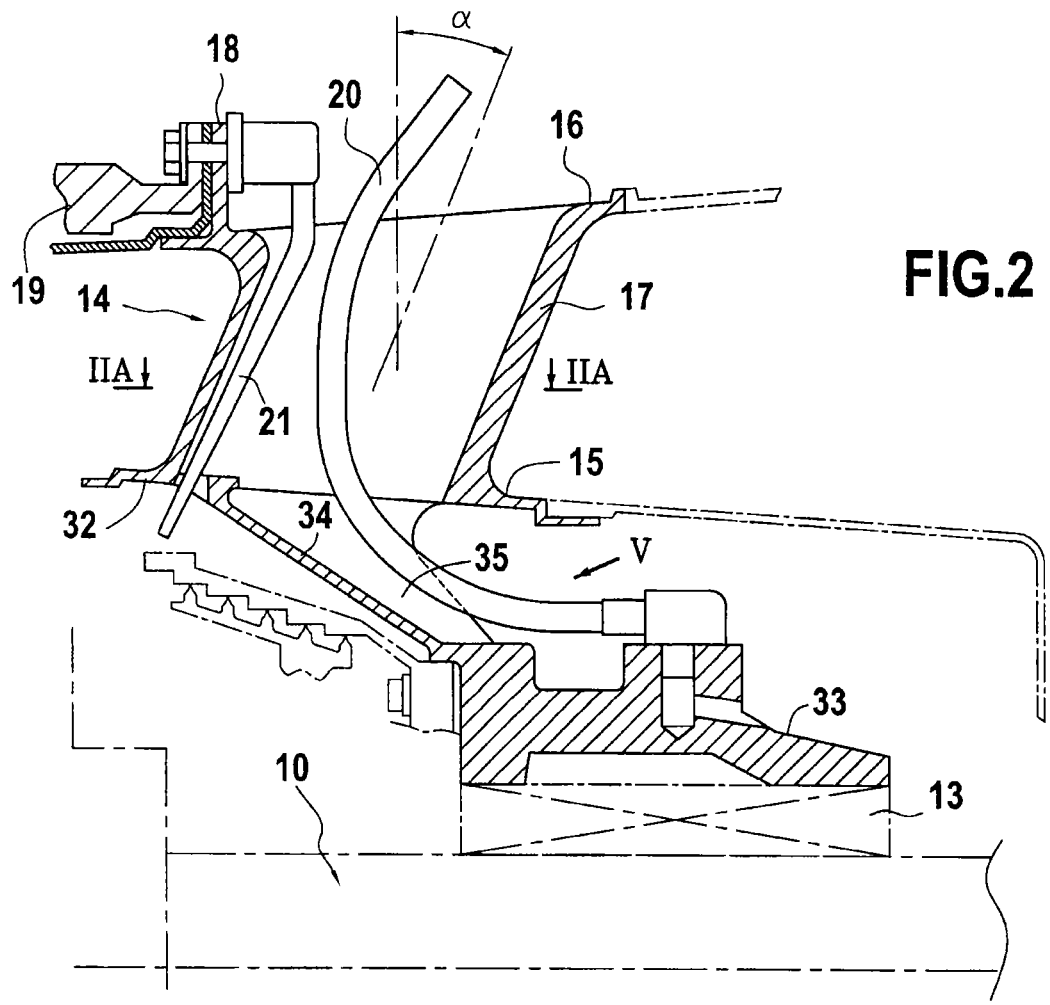
FIG. 2 is a diagrammatic longitudinal section view of a bearing support in an embodiment of the invention.
Figure 2A:
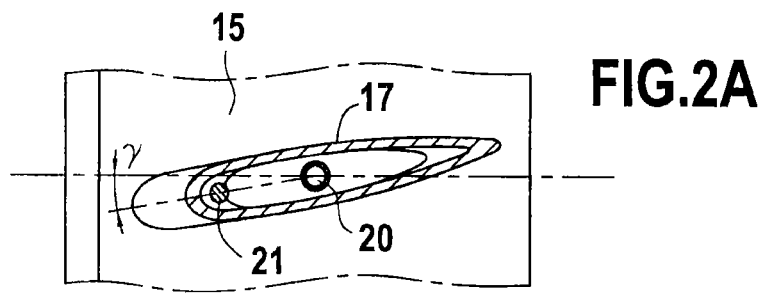
FIG. 2A is a cross-section of an arm of the FIG. 2 support on line IIA-IIA.

With reference now to FIG. 2A, it can be seen how each radial arm 17 presents a streamlined profile with a main axis that is pitched angularly relative to the axial direction. In the embodiment shown, the pitch angle γ of the profile is less than or equal to 30°. By way of example, it can thus align the main axis of the profile with the flow direction of the gas downstream from the turbine wheel 22, thereby reducing the resistance of the radial arms 17 to the flow. Simultaneously, this pitch angle increases the stiffness of the radial arms in bending in a transverse plane of the bearing support 14.

The central hub 15 includes an outer ring 32 where the roots of the radial arms 17 are located, an inner ring 33 forming said outer seat of the bearing 13, and a conical wall 34 connecting together said outer and inner rings 32 and 33 of the central hub 15. In order to limit the weight of the central hub 15, these outer and inner rings 32 and 33, and above all the conical wall 34, may all be relatively thin. Nevertheless, in order to ensure that the central hub 15 is rigid, the conical wall 34 nevertheless presents radial ribs 35 as shown in particular in FIG. 5.

In operation, the bearing support 14 may be subjected to temperatures lying in the range 400° C. to 700° C., which temperatures are typically higher at the center of the gas flow passage than in its radially inner and outer regions. In spite of that, e.g. with a refractory alloy based on nickel or on cobalt, it is possible with the shape shown and with dimensions that are typical of a turboshaft engine, to obtain radial stiffnesses of the order of 20,000 newtons per meter (N/m) to 80,000 N/m, and more particularly lying in the range 60,000 N/m to 70,000 N/m, while ensuring a good lifetime, e.g. at least 6400 hours (h) of operation.

Although the present invention is described with reference to a specific embodiment, it is clear that various modifications and changes can be applied to these examples without going beyond the general scope of the invention as defined by the claims. Consequently, the description and the drawings should be considered in a sense that is illustrative rather than restrictive.

The invention claimed is:

1. A support for at least one bearing for a hot section of a turboshaft engine, the support comprising:
   at least a central hub incorporating an outer bearing seat for receiving the bearing;
   an annular casing segment around the central hub; and
   a plurality of radial arms connecting the central hub to the annular casing segment,
   wherein the radial arms are inclined in an axial direction and in a tangential direction, and are integrated in a single monolithic piece with the central hub and the outer bearing seat and with the annular casing segment,
   wherein the central hub comprises an outer ring where inner roots of the radial arms are situated, and an inner ring forming the outer bearing seat, the outer and inner rings of the central hub being connected, the inner ring being further downstream than the outer ring, and
   wherein each radial arm is hollow, a lubricating fluid duct passes through at least one of the radial arms, and one end of the lubricating fluid duct is connected to the inner ring of the central hub.

2. The support according to claim 1, further comprising at least one fastener flange on an axial end of the annular casing segment, each radial arm being inclined axially from an outer root on the annular casing segment towards the axial end presenting the fastener flange.

3. The support according to claim 2, wherein the fastener flange is festooned in register with the outer root of each radial arm over the annular casing segment.

4. The support according to claim 2, wherein the fastener flange presents at least one positive engagement element for taking up forces in a plane perpendicular to a central axis of the bearing.

5. The support according to claim 2, wherein the fastener flange is disposed downstream of a free turbine of the turboshaft engine.

6. The support according to claim 1, wherein the central hub comprises a conical wall connecting together the outer and inner rings of the central hub.

7. The support according to claim 6, wherein the conical wall presents radial ribs.

8. The support according to claim 1, wherein the radial arms present a tangential angle of inclination that is not greater than 70°.

9. The support according to claim 1, wherein the radial arms present an axial angle of inclination that is not greater than 45°.

10. The support according to claim 1, wherein each of the radial arms has a streamlined profile that is pitched at a pitch angle relative to an axial direction.

11. The support according to claim 10, wherein the pitch angle is not greater than 30°.

12. A turboshaft engine comprising:
    at least one support for at least one bearing of a hot section of the turboshaft engine, the support comprising:
    at least a central hub incorporating an outer bearing seat for receiving the bearing;
    an annular casing segment around the central hub, and
    a plurality of radial arms connecting the central hub to the annular casing segment,
    the radial arms inclined in an axial direction and in a tangential direction, and integrated in a single monolithic piece with the central hub and the outer bearing seat and with the annular casing segment,
    wherein the central hub comprises an outer ring where inner roots of the radial arms are situated, and an inner ring forming the outer bearing seat, the outer and inner rings of the central hub being connected, the inner ring being further downstream than the outer ring, and
    wherein each radial arm is hollow, a lubricating fluid duct passes through at least one of the radial arms, and one end of the lubricating fluid duct is connected to the inner ring of the central hub.

13. The turboshaft engine according to claim 12, wherein the support is situated adjacent to and downstream from a turbine wheel of the turbine engine, and the radial arms are axially inclined in an upstream direction from the annular casing segment.

14. The turboshaft engine according to claim 13, wherein the support includes a fastener flange situated at an upstream axial end of the annular casing segment.

15. The turboshaft engine according to claim 14, wherein the fastener flange is disposed downstream of a free turbine of the turboshaft engine.

16. The turboshaft engine according to claim 12, further comprising:
    at least one compressor;
    a combustion chamber;
    a first combustion gas turbine coupled to rotate with the at least one compressor by a first rotary shaft; and a second combustion gas turbine coupled to rotate with a power takeoff by a second rotary shaft,
wherein the single piece support supports at least one bearing of the second rotary shaft.

* * * * *